United States Patent

Haynes et al.

[11] Patent Number: 6,056,366
[45] Date of Patent: May 2, 2000

[54] COMPOSITE BACK FRAME FOR A VEHICLE SEAT AND METHOD FOR DISTRIBUTING SEAT BELT LOADS

[75] Inventors: Ian Haynes, Windsor, Canada; Michelle Girolamo, Livonia; John P. Slaven, Harper Woods, both of Mich.

[73] Assignee: Lear Corporation, Southfield, Mich.

[21] Appl. No.: 09/258,577

[22] Filed: Feb. 26, 1999

[51] Int. Cl.[7] .................................................. A47C 7/02
[52] U.S. Cl. ................... 297/452.18; 297/216.1; 297/216.13; 297/452.31; 297/483; 297/484
[58] Field of Search .................... 297/452.18, 452.31, 297/216.1, 216.13, 216.15, 483, 484

[56] References Cited

U.S. PATENT DOCUMENTS

| | | | |
|---|---|---|---|
| 3,695,696 | 10/1972 | Lohr et al. | 297/483 X |
| 3,832,002 | 8/1974 | Eggert, Jr. et al. | 297/484 X |
| 4,040,660 | 8/1977 | Barecki | 297/484 X |
| 4,530,541 | 7/1985 | Resag et al. | 297/452.18 |
| 4,595,238 | 6/1986 | Goldner | 297/452.18 |
| 4,749,231 | 6/1988 | Cremer et al. | 297/483 X |
| 4,919,488 | 4/1990 | Deegener et al. | 297/484 X |
| 5,022,677 | 6/1991 | Barbiero | 297/483 X |
| 5,029,942 | 7/1991 | Rink | 297/452.18 |
| 5,123,673 | 6/1992 | Tame | 297/484 X |
| 5,181,758 | 1/1993 | Sandvik | 297/483 X |
| 5,246,271 | 9/1993 | Boisset | 297/483 X |
| 5,253,924 | 10/1993 | Glance | 297/216.13 X |
| 5,318,341 | 6/1994 | Griswold et al. | 297/452.18 X |
| 5,328,249 | 7/1994 | Ball | 297/483 |
| 5,362,129 | 11/1994 | Itoh et al. | 297/452.18 X |
| 5,364,170 | 11/1994 | West | 297/483 |
| 5,390,982 | 2/1995 | Johnson et al. | 297/483 X |
| 5,401,072 | 3/1995 | Farrand | 297/483 X |
| 5,411,319 | 5/1995 | Kuiri | 297/483 |
| 5,441,332 | 8/1995 | Verellen | 297/483 |
| 5,452,941 | 9/1995 | Halse et al. | 297/483 X |
| 5,468,053 | 11/1995 | Thompson et al. | 297/452.18 X |
| 5,547,259 | 8/1996 | Fredrick | 297/452.18 |
| 5,575,533 | 11/1996 | Glance | 297/452.2 |
| 5,577,805 | 11/1996 | Glinter et al. | |
| 5,599,070 | 2/1997 | Pham et al. | 297/483 |
| 5,645,316 | 7/1997 | Aufrere et al. | 297/483 X |
| 5,653,506 | 8/1997 | Wisner et al. | 297/216.1 X |
| 5,660,443 | 8/1997 | Pedronno | |
| 5,671,976 | 9/1997 | Fredrick | 297/452.18 |
| 5,681,081 | 10/1997 | Lindner et al. | 297/483 X |
| 5,697,670 | 12/1997 | Husted et al. | 297/483 X |
| 5,722,731 | 3/1998 | Chang | 297/483 X |
| 5,733,013 | 3/1998 | Brown | 297/483 |
| 5,769,493 | 6/1998 | Pejathaya | |
| 5,769,499 | 6/1998 | Dudash et al. | 297/452.18 |
| 5,782,537 | 7/1998 | Leistra et al. | 297/452.18 X |
| 5,786,394 | 7/1998 | Slaven | |
| 5,788,330 | 8/1998 | Ryan | |
| 5,795,024 | 8/1998 | Collins et al. | 297/452.18 X |
| 5,806,891 | 9/1998 | Pokhis | 297/216.13 X |
| 5,823,627 | 10/1998 | Viano et al. | 297/216.13 X |
| 5,826,936 | 10/1998 | Scordato et al. | 297/216.1 |
| 5,826,946 | 10/1998 | Matthews et al. | 297/216.13 X |
| 5,829,831 | 11/1998 | Sharman | 297/483 X |
| 5,851,055 | 12/1998 | Lewis | 297/483 |
| 5,895,096 | 4/1999 | Massara | 297/452.18 X |
| 5,951,110 | 9/1999 | Conner et al. | 297/452.31 |

FOREIGN PATENT DOCUMENTS

| | | | |
|---|---|---|---|
| 1440281 | 4/1966 | France | 297/484 |
| 2261906 | 9/1975 | France | 297/484 |
| 2425957 | 1/1980 | France | 297/484 |
| 1150085 | 4/1969 | United Kingdom | 297/484 |
| 1438905 | 6/1976 | United Kingdom | 297/452.31 |
| 2134381 | 8/1984 | United Kingdom | 297/484 |

*Primary Examiner*—Peter M. Cuomo
*Assistant Examiner*—Rodney B. White
*Attorney, Agent, or Firm*—Brooks & Kushman P.C.

[57] ABSTRACT

A vehicle set back frame that is lightweight and sufficiently rigid to be incorporated in an all-belts-to-seat seat belt mechanism. A seat back shaped back frame is C-shaped in cross-section and wrapped with a load-transfer panel and a lumbar panel to form a box frame which houses seat belt retractors and resists back frame deformation due to frontal impact of the vehicle. A method of distributing seat belt loads is also disclosed.

9 Claims, 2 Drawing Sheets

COMPOSITE BACK FRAME FOR A VEHICLE SEAT AND METHOD FOR DISTRIBUTING SEAT BELT LOADS

TECHNICAL FIELD

The present invention relates to the back frame of a vehicle seat that is lightweight and sufficiently rigid to be incorporated with an all-belts-to-seat seat belt mechanism.

BACKGROUND ART

Vehicle seats with all-belts-to-seat seat belt mechanisms are becoming increasingly important because of the simplification in vehicle design that these mechanisms allow. The seat belt mechanism restrains the occupant during impact during a collision. In an all-belts-to-seat design the seat belt mechanism is integral with the vehicle seat. This type of seat belt mechanism once adjusted to the comfort of the occupant does not require readjustment when the seat as a whole is moved. All-belts-to-seat mechanisms allow for simplification of automobile design because the structural requirements of the B-pillar are reduced such that the need for the B-pillar becomes superfluous (convertibles lack B-pillars). The B-pillar is the section of the vehicle frame that runs between the front and rear windows. However, the structural requirements of the seat increase. The seat must be sufficiently rigid to withstand the forces generated during a collision. Previous attempts to provide the requisite strength have fortified the vehicle seat with various metals or rigid composites. Other attempts to strengthen vehicle seats have done such by increasing the seat component dimensions. These approaches tend to increase the weight of the vehicle which is undesirable.

Currently, most commercial vehicles utilize a three point seat beat mechanism. In the typical three point mechanism, a seat belt retractor pays out seat belt webbing that passes through a D-ring that is attached to the B-pillar of the vehicle frame. The section of the seat belt webbing that runs from the D-ring diagonally across the occupant is usually referred to as the shoulder belt. The shoulder belt attaches to a point on the opposite side of the occupant. From this point of attachment, the seat belt seat belt webbing travels across the occupant to a point of attachment on the opposite side. This latter section of webbing is usually referred to as the lap belt. These last two points of attachment are typically made to the vehicle body floor. Three point seat belt mechanisms unevenly disperse the forces that are developed during a collision by creating a greater force exerted on the side of the occupant closest to the B-pillar. The uneven dispersion of the impact forces creates a twisting motion of the occupant about the B-pillar. During collision only a small amount of the seat belt webbing is paid out.

A four point seat belt mechanism is more desirable than the standard three point seat belt mechanisms because in such a mechanism forces created during a collision are more symmetrically dispersed about the vehicle seat. In a four point mechanism, two points of seat belt attachment are located on both sides of the vehicle occupant. More symmetrical dispersion of the impact forces has less tendency to cause a twisting motion and less accumulation of the force on any given side of the occupant. Thus the four point design is more suitable for vehicles without B-pillars, such as convertibles and vans which have seats that swivel. But with the four point design there is a problem. The seat back frame needs to be sufficiently strong to absorb and disperse the impact forces, and to provide a sufficient cavity for housing the seat belt mechanism.

DISCLOSURE OF INVENTION

The vehicle seat back frame includes a seat back-shaped channel having a C-shape in cross-section of sufficient depth to provide a protective environment for the seat belt mechanism. The seat back-shaped channel is constructed from a lightweight carbon fiber composite that is both rigid and lightweight. The back frame also includes a lumbar panel on one side of the seat back. The lumbar panel provides support for the vehicle occupant and is typically prepared from a lightweight inexpensive thermoplastic such as polyethylene. On the opposing side of the seat backed-shaped channel, a load transfer panel is situated. This load transfer panel is flexure-resistant and has a mounting surface adapted to mount the seat belt mechanism within the protective environment. The load transfer panel is prepared from a carbon fiber or glass fiber composite. The lumbar panel and the load transfer panel combine with the C-shape of the seat back-shaped channel to form a box frame sufficiently strong to resist back frame deformation due to frontal impact of the vehicle. The load transfer panel supports a tensile-loaded strap to distribute loads applied to the seat belt mechanism. This tensile loaded strap will typically be prepared from unidirectional carbon fiber molded with either carbon fiber or a glass composite.

Accordingly, it is an object of the present invention to provide an improved vehicle seat back frame suitable for incorporation in an all-belts-to-seat seat belt system.

Another object of the present invention is to provide an improved vehicle seat back frame that is lightweight.

Still another object of the present invention is to provide an improved vehicle seat back frame that is lightweight and does not add a significant amount of weight to the vehicle.

Still another object of the present invention is to provide an improved vehicle seat back frame that is rigid and resists twisting during a front impact collision.

Yet another object of the present invention is to provide an improved method for distributing seat belt loads to a back frame for a vehicle seat.

A more specific object of this invention is the provision of a composite back frame for a vehicle seat in mounting relationship to a seat belt mechanism. The back frame has a carbon fiber preform seat back channel having a C-shape in cross section of sufficient depth to provide a protective environment for the seat belt mechanism. The back frame also has a lumbar panel on one side of the seat back-shaped channel and a load transfer panel on the other side of the seat back-shaped channel. The load transfer panel is flexure-resistant and has a mounting surface adapted to mount the seat belt mechanism within the protective environment. The lumbar panel and the load transfer panel combine with the C-shape of the seat back-shaped channel to form a box frame sufficiently strong to resist back frame deformation due to front impact of the vehicle. The load transfer panel supports a tensile loaded strap to distribute loads applied to the seat belts mechanism during such frontal impact.

Another more specific object in the invention of last mentioned object includes a composite back frame wherein the tensile loaded strap is a composite having a unidirectional composite fiber material sandwiched between layers of carbon fiber.

Another object of the invention is a method of distributing seat belt loads to a back frame for a vehicle seat which comprises forming the back frame into a generally U-shape from a C-shaped channel, spanning the generally U-shape with a panel, mounting a seat belt mechanism to the panel, and installing a composite strap from the back frame to the seat belt mechanism where such mechanism mounts to the panel, whereby to distribute loads applied to the seat belt mechanism to the back frame.

In carrying out the above objects and other objects and features of the present invention, a vehicle seat back frame is described in a mounting relationship to a seat belt mechanism. The seat belt mechanism and the vehicle seat back frame of the present invention provides advantages to an automobile manufacturer by allowing relaxation of structural requirements of the B-pillar, by allowing for reduction in weight of the automobile, by allowing for modular seats, and by reducing attendant costs. Further, the present design allows for adjustment of position of the vehicle seat without the need for concurrent adjustment of the seat belt system.

The above objects and other objects, features, and advantages of the present invention are readily apparent from the following detailed description of the best mode for carrying out the invention whin taken in connection with the accompanying drawings.

BEST MODE FOR CARRYING OUT THE INVENTION

Figure 1:
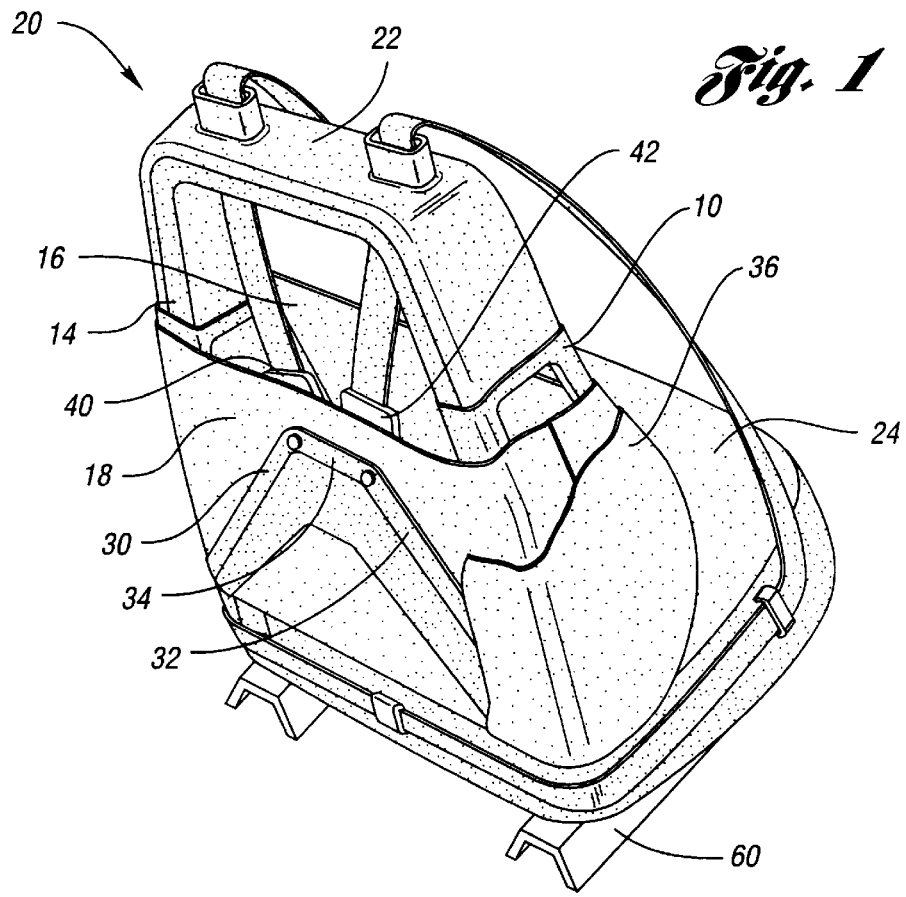
FIG. 1 is a perspective rear, partially broken away view of a vehicle seat to illustrate the box frame composite of carbon fiber, load transfer panel, and lumbar panel in a seat back frame for housing and supporting a seat belt mechanism.
Figure 4:
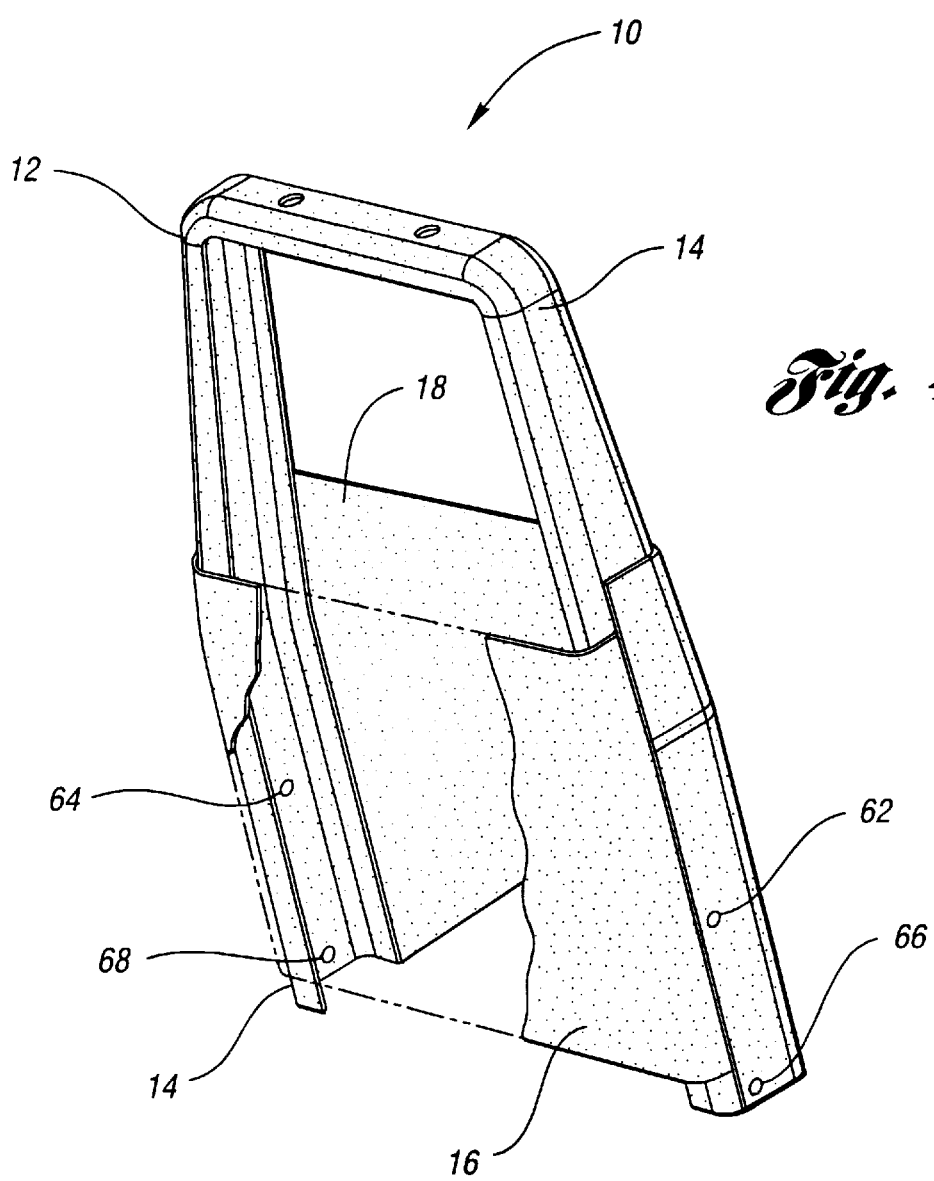
FIG. 4 is a perspective front view of the carbon fiber seat back frame, partially broken away, to show the box frame composite of the load transfer and lumbar panels.

With reference to FIG. 4, the carbon fiber seat back frame 10 of the subject invention is a generally inverted U-shaped component 12 of an all-belts-to-seat vehicle seat consisting of a seat back-shaped channel 14 spanned across the front with a lumbar panel 16 and across the back with a load transfer panel 18. The general construction of an all-belts-to-seat vehicle seat may be illustrated with respect to FIG. 1. In FIG. 1, a vehicle seat 20 is shown with a seat back 22 and a seat 24 both of which are upholstered with fabric or leather covered padding 26. The generally U-shaped carbon fiber back frame 10 supports the padded upholstery 26. The seat back frame 10 is contained within and supports the seat back 22.

Figure 2:
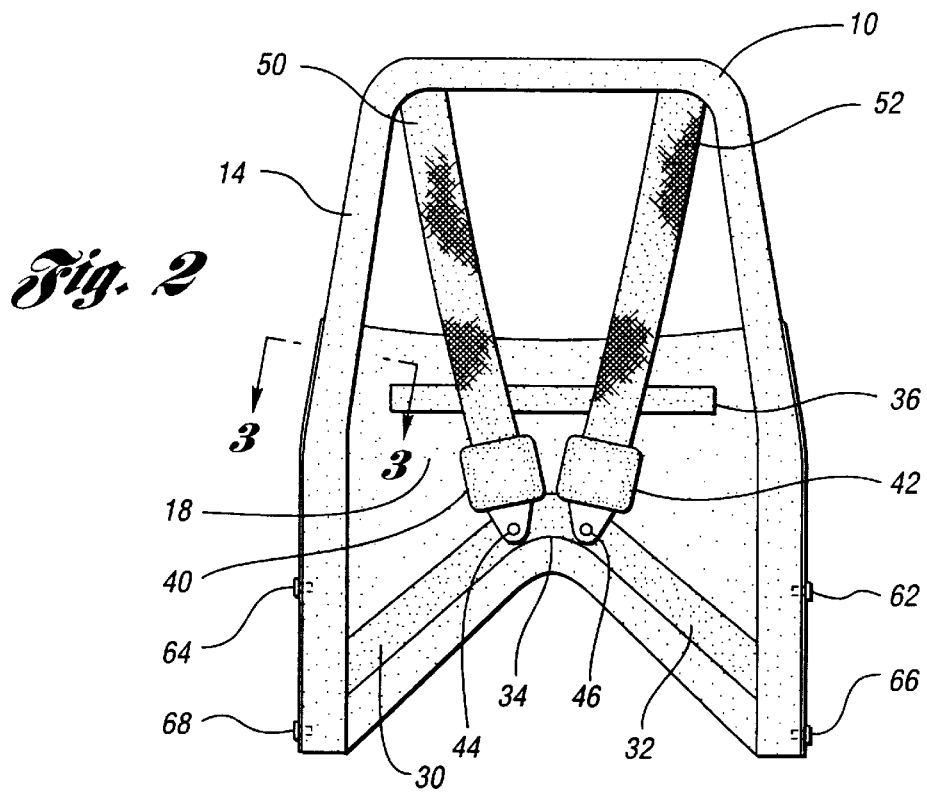
FIG. 2 is elevational front view of the carbon fiber seat back frame with the lumbar panel removed.
Figure 3:
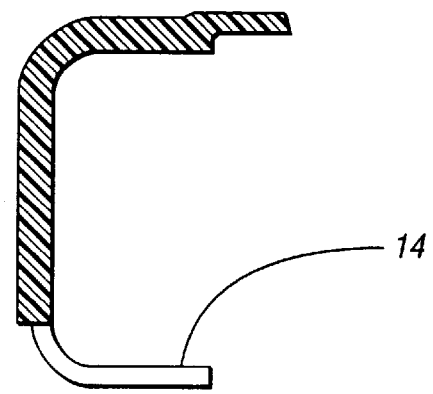
FIG. 3 is a cross-sectional view taken along line 3—3 in FIG. 2 to show the C-shape of the seat back shaped channel.

The carbon fiber back frame 10 itself may be more particularly described with respect to FIG. 2 and FIG. 3. In FIG. 2, the seat back frame 10 is a generally inverted U-shaped construction. However, it is noted that the actual shape of the seat back will be dictated by the aesthetic design of the seat back itself, and need not be a strict "U" shape. In order to provide the requisite strength needed during a front impact collision, seat back shape channel 14 is prepared from a carbon fiber composite. The seat back shaped channel 14 may be prepared by either the SMC (sheet molding compound) process or the pultrusion process. In FIG. 3, seat back channel 14 is shown to be C-shaped in cross-section. In FIG. 2, the load transfer panel 18 is clearly shown to attach to seat backed-shaped channel 14 by bolts at bolt holes 62, 64, 66, and 68. Tensile loaded strips 30, 32, and 34 are shown to be embedded in load transfer panel 18. An additional strap 36 may be embedded along the top of panel 18. Seat belt retractors 40, 42 are bolted to load transfer panel 18 at 44, 46. The seat belt webbing 50, 52 is shown to emerge from the respective seat belt retractor 40, 42. Tensile loaded strap 30, 32, 34 are prepared from unidirectional carbon fibers molded between layers of carbon fiber. Alternatively, tensile load strap 34 may be replaced with a metal plate for the purpose of rigidly linking retractors 40 and 42 together. The unidirectional direction of the carbon fibers provides strength to the strap in the direction of the fiber. Alternatively, unidirectional glass fibers may be used instead of unidirectional carbon fibers. Load transfer panel 18 is prepared from either a carbon fiber composite or a carbon/glass composite. The load transfer panel 18 may be prepared by either the SMC process or the bulk molding compound process. The composition of load transfer panel 18 is such that the materials are less expensive than the cost of that of tensile loaded straps 30, 32, 34. Tensile loaded straps 30, 32, 34 are placed at positions where forces developed during a front impact collision are likely to be concentrated. The positioning of tensile loaded straps 30, 32, 34 allow for a reduction of cost because during a front impact collision, forces are created along seat belt webbing 50, 52 when the vehicle occupant is thrown forward. These forces are transferred to seat belt retractors 40, 42 which in turn transfer the force to tensile loaded straps 30, 32, 34.

Referring to FIGS. 1 and 4, a perspective view of the back frame 10 is given. Seat back frame 10 is connected to a recliner mechanism (not shown) via bolts passed through bushings at bolt holes 62, 64, 66, 68. The recliner mechanism is fixed with respect to the lower frame 60 of vehicle seat 20.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A back frame for a vehicle seat in mounting relationship to a seat belt mechanism and comprising:

a U-shaped composite seat back shaped channel having two side beam portions and an upper beam portion connecting the two side beam portions and having a C-shape in cross-section of sufficient depth to provide a protective environment for the seat belt mechanism;

a lumbar panel on the front side of the seat back-shaped channel;

a load transfer panel on the back side of the seat back-shaped channel being flexure-resistant and having a mounting surface adapted to mount the seat belt mechanism within the protective environment;

the lumbar panel and the load transfer panel combining with the C-shape of the seat back-shaped channel to form a box frame sufficiently strong to resist back frame deformation due to frontal impact of the vehicle; and the load transfer panel supporting a tensile-loaded strap to distribute loads applied to the seat belt mechanism during such frontal impact.

2. The composite back frame of claim 1 wherein the lumbar panel and the load transfer panel are made of more cost-effective material than the seat back-shaped channel and the tensile loaded strap whereby to make the back frame lightweight and low cost.

3. The composite back frame of claim 1 wherein the seat back-shaped channel is a carbon fiber preform.

4. The composite back frame of claim 1 wherein the lumbar panel is thermoplastic.

5. The composite back frame of claim 1 wherein the tensile-loaded strap is a composite having a unidirectional composite fiber material sandwiched between layers of carbon fiber.

6. The composite back frame of claim 1 wherein the load transfer panel is carbon fiber.

7. The composite back frame of claim 1 wherein the seat back-shaped channel includes a recliner attachment and the tensile-loaded strap distributes the loads applied to the seat belt mechanism to such recliner attachment.

8. A method of distributing seat belt loads to a back frame for a vehicle seat comprising:

forming the back frame into a generally U-shape from a C-shaped composite channel;

spanning the generally U-shape with a panel;

mounting a seat belt mechanism to the panel; and installing a composite strap from the back frame to the seat belt mechanism where said seat belt mechanism mounts to the panel, whereby to distribute loads applied to the seat belt mechanism to the back frame.

9. The method of claim 8 further comprising spanning the generally U-shape with a second panel opposite the first panel so that a box frame is formed by the C-shaped channel and the two spanning panels.

* * * * *